(12) United States Patent
Janssen

(10) Patent No.: US 8,500,317 B2
(45) Date of Patent: Aug. 6, 2013

(54) VEHICLE ILLUMINATING DEVICE COMPRISING AN AUXILIARY REFLECTOR FOR LATERAL DEFLECTION OF A LIGHT PORTION OF A LIGHT SOURCE

(75) Inventor: Andre Janssen, Isenbüttel (DE)

(73) Assignee: Volkswagen AG, Wolfsburg (DE)

( * ) Notice: Subject to any disclaimer, the term of this patent is extended or adjusted under 35 U.S.C. 154(b) by 458 days.

(21) Appl. No.: 12/669,088

(22) PCT Filed: Jul. 11, 2008

(86) PCT No.: PCT/EP2008/059093
§ 371 (c)(1),
(2), (4) Date: May 6, 2010

(87) PCT Pub. No.: WO2009/010465
PCT Pub. Date: Jan. 22, 2009

(65) Prior Publication Data
US 2010/0290243 A1 Nov. 18, 2010

(30) Foreign Application Priority Data

Jul. 17, 2007 (DE) .......................... 10 2007 033 711

(51) Int. Cl.
*G02B 6/00* (2006.01)
*F21S 8/10* (2006.01)

(52) U.S. Cl.
USPC ............................ 362/551; 362/519; 362/541

(58) Field of Classification Search
USPC ................. 362/544, 543, 546, 507, 516, 263, 362/520, 509, 247, 240, 311, 310
See application file for complete search history.

(56) References Cited

U.S. PATENT DOCUMENTS

| 5,055,983 A | 10/1991 | Hunold et al. ............... 362/80 |
| 2002/0018349 A1 | 2/2002 | Aikawa ..................... 362/520 |
| 2002/0181236 A1 | 12/2002 | Aoki .......................... 362/296 |
| 2003/0227781 A1 | 12/2003 | Mochizuki ................ 362/517 |

FOREIGN PATENT DOCUMENTS

| DE | 2140165 | 2/1973 |
| DE | 3239754 | 5/1984 |
| DE | 9001659 | 4/1990 |
| DE | 19624244 | 1/1998 |

(Continued)

OTHER PUBLICATIONS

International PCT Search Report, PCT/EP2008/059093, 12 pages, Mailed Oct. 21, 2008.

*Primary Examiner* — Anh Mai
*Assistant Examiner* — Elmito Breval
(74) *Attorney, Agent, or Firm* — King & Spalding L.L.P.

(57) ABSTRACT

A vehicle illuminating device for the integrated attachment in each edge region of a motor vehicle, has a housing with at least one chamber, a light source positioned in a bracket, a reflector, an intermediate light disc with a prism arranged therein in at least partial regions, wherein the intermediate light disc has at least one signal function region dyed in a signal color, and electric connection contacts and a cover housing disc are spaced from the light disc. The reflector has in a first chamber a lateral section provided in a predominantly horizontal, lateral direction facing away from the vehicle. The housing has a lateral light region extending into the lateral region of the vehicle body, an additional lateral intermediate light disc arranged in the region, wherein the cover housing disc covers also the lateral light region with the lateral intermediate light disc from the outside at a distance.

20 Claims, 3 Drawing Sheets

FOREIGN PATENT DOCUMENTS

| | | |
|---|---|---|
| DE | 19732742 | 2/1999 |
| DE | 19820656 | 11/1999 |
| DE | 69512614 | 5/2000 |
| DE | 19860669 | 7/2000 |
| DE | 19916845 | 10/2000 |
| DE | 10036324 | 2/2002 |
| DE | 10332977 * | 7/2005 |
| DE | 10361488 | 7/2005 |
| DE | 102004002225 | 8/2005 |
| DE | 102004003577 | 9/2005 |
| DE | 102004047548 | 4/2006 |
| EP | 0715988 | 6/1996 |
| EP | 1610157 | 12/2005 |

* cited by examiner

VEHICLE ILLUMINATING DEVICE COMPRISING AN AUXILIARY REFLECTOR FOR LATERAL DEFLECTION OF A LIGHT PORTION OF A LIGHT SOURCE

CROSS-REFERENCE TO RELATED APPLICATIONS

This application is a U.S. National Stage Application of International Application No. PCT/EP2008/059093 filed Jul. 11, 2008, which designates the United States of America, and claims priority to German Application No. 10 2007 033 711.8 filed Jul. 17, 2007, the contents of which are hereby incorporated by reference in their entirety.

TECHNICAL FIELD

The invention relates to a vehicle illuminating device, particularly a tail lamp of a motor vehicle.

BACKGROUND

It is known that the illumination of a vehicle is subject to security relevant aspects and in particular has to indicate the light signals of the driver reliably, but as well the light signals marking the vehicle. In this connection there exist technical requirements with respect to the minimum and maximum illuminating power of the commonly used light signals such as flashing indicator, rear light, brake light, back-up light, rear fog light and so on, in order to be visible well during daylight and not to be excessively bright at night in order to not to blind other traffic participants. In particular, there exists a requirement to also provide the light signals in a well recognizable and visible way in a viewing direction lateral to the vehicle.

For this, as an example a classical and proven means has been to provide an additional doubling lamp each for the front and rear flashing indicator, which is arranged laterally on the body of the vehicle. Often such a second flashing indicator lamp is provided in a side mirror. This requires additional expenses with respect to material and mounting, by which additional costs arise and correspondingly the repairs and maintenance expenses are increased in addition. In some countries, such as the US, there exist traffic related regulations, which dictate a lateral visibility of tail lamps, flashing indicators and brake lamps, respectively. Many producers try to solve this problem without an additional lateral lamp in that they design the vehicle lamps in such a way, that these additionally also emit the respective light signals to the side and away from the vehicle. In the following a range of such solutions is presented.

Disclosed in DE 21 40 165 B2 is a reflector for motor vehicle lamps comprising within the same curved region at least two separated curved reflector planes, which are formed of rib-like partial plane supports which are arranged alternating adjacent to each other and form two different oriented concave reflectors. Each of the reflectors thereby has a discontinuous surface and therefore only directs a portion of the light into the intended direction, wherein the two emitting directions may only differ in a relatively small angle which has to be much smaller than 90°.

Disclosed in DE 90 01 659 U1 is a tail lamp of a motor vehicle in which the reflector for the flashing indicator extends across the entire width of the rear area of the light disc section for the flashing indicator and extends far into the lateral region of the light disc section. The reflector comprises regions which are occupied by triangular prism and cylindrical lenses which are arranged facing towards the light sources at the inner side of the reflector forming the outer shell of the tail lamp. Furthermore, disclosed is an additional intermediate light disc or an optical disk which is also occupied by lenses facing inside in the direction of the light source. Furthermore, the reflector is provided with ribs or grooves which serve as an optical light dispersion means. The regions between each of the functional areas of the reflector not used have roughened surfaces in order to separate the functional areas.

DE 10036 324 A1 shows a multi chamber lamp in which for increasing the brightness a rod- or strip-shaped fiber-optic light guide is arranged such that the light is deflected into the adjacent light disc sections, wherein the fiber-optic light guide comprises optical means which deflect the light into the desired light direction. The light disc is designed bell-shaped and has on its front side facing towards the light source optical means, particularly prism, which concentrate the light incident thereon and further other optical means, which disperse the light. In order to separate single functional light areas intermediate partial regions are made impervious to light, as for example also the fiber-optic light guide is made with a vapor deposited metal layer on the side opposing the light disc. The light disc is integrally designed with the optical means and serves as a colored filter or may comprise colored filters.

DE 10 2004 047 548 A1 discloses a tail lamp serving as a third brake lamp in the rear area of a vehicle in which the light disc for reasons of easier mounting is designed in two segments and is sealed against the body parts of the vehicle using gaskets. This is an additional lamp and therefore implies additional cost, wherein it moreover does not lead to an increase in lateral visibility.

Disclosed in DE 103 32 977 A1 is a tail lamp in which two illuminating coils are provided in a light source serving as a light bulb, whose light is separately supplied to two different functional areas by means of optical means such as fiber-optic light guides and lenses, for example to the brake light and the tail lamp. Fiber-optic light guides, prism and lenses are provided as an optical means. One or more fiber-optic light guides are provided for the one filament and the lens is pointed towards the second filament with its focus. This solution requires a specific light bulb comprising the two illuminating coils spaced from each other.

DE 103 61 488 A1 discloses a lamp for motor vehicles, which proposes to solve the heat problems of a lamp such as to arrange optical prism areas in the base part of the light source, in this case a light bulb, which deflect the incident light into the light outlet direction of the lamp. This way indeed a better light emitting efficiency reducing the heat losses is reached, but a specific broadening of the light outlet angle is not effectively reached.

Disclosed in DE 197 32 742 A1 is a preferably frontally positioned lamp installation of a motor vehicle in which for reasons of fulfilling regulations for lateral visibility of the light signals the reflector has a discontinuous region through which a portion of the light of the same light source may leave laterally. In this connection, the reflector plane is discontinuous and the light of the light source without being deflected directly leaves to the outside laterally through the cover disc, which on its inner side may comprise optical means such as lenses or prism for scattering the light. With this solution an additional reflector manufactured and mounted as an individual component is used, by which additional cost is generated.

DE 198 20 656 A1 discloses a multi chamber lamp for vehicles, which for the purpose of reducing the loss of light and for covering the inner parts of the lamp against visual access from the outside comprises non optical regions and covering regions in the intermediate light disc and the covering disc.

DE 198 60 669 A1 discloses a headlamp in which for the purpose of improved allocation of the low and high beam areas bezels are arranged in front of the light source and in which these bezels serve as reflectors on their back side, wherein the light reflected back is pointed at an additional reflector for the near area formed above.

DE 694 01 314 T2 proposes, essentially for reasons of design, to use light scattering elements made of a transparent plastic material comprising light reflecting metallic particle for laterally framing a vehicle lamp. Thereby indeed also the illuminating angle may be enlarged, but the attenuation of light due to light scattering may be too large, so that the brightness of a vehicle lamp may be afflicted.

EP 0 715 988 B1 and DE 695 12 614 T2 disclose a vehicle tail lamp in which a intermediate light disc, the reflector and the outer end casing comprise optical means such as prism and cylindrical concave lenses which are arranged in rows on the side facing the light source and facing in the direction towards the light source. Such additional optical means do not allow for to always, and not in each application, achieve the required broadening of the light outlet angle and thereby the required lateral visibility of the light signals.

Furthermore it is an requirement to form a vehicle illuminating device, in particular that of a passenger car, as compact as possible, so that it may be adapted to the desired external shape of the body of the passenger vehicle without, in doing so, requiring too much of the inner space of the vehicle which would be lost at the cost of a reduced volume of the trunk.

SUMMARY

According to various embodiments, based on at least one light source the emitting angle of at least a functional illuminating area of a vehicle lamp can be aligned such that the light of this light source in addition to its main alignment along the vehicle also is emitted laterally towards the outside of the motor vehicle in a at least perpendicular angle and comprising a brightness which meets the respective regulations of the lateral marking requirements, which is to mean to clearly mark the vehicle in a lateral direction and to thereby allow for a high level of compactness of the vehicle lamp.

According to an embodiment, a vehicle illuminating device for integrated mounting in each of an edge region of a motor vehicle, the housing of which is provided with at least one chamber, at least one light source positioned in a bracket, at least one reflector, at least one intermediate light disc comprising therein optical means at least formed in partial regions, wherein the intermediate light disc has at least one signal function region dyed in a signal color, the electrical connection contacts and a cover housing disc arranged in a manner spaced from the intermediate light disc, wherein the at least one reflector has at least one lateral section in a first chamber, which is provided in a essentially horizontal direction laterally facing away from the motor vehicle, the housing of the vehicle device has a lateral light region extended into the lateral region of the body of the vehicle, in which an additional lateral intermediate light disc is arranged, and wherein the cover housing disc also covers the lateral light region comprising the lateral intermediate light disc from the outside with a distance.

According to a further embodiment, in the lateral light region extended into the lateral region of the body of the vehicle in which a additional lateral intermediate light disc is arranged a additional lateral fiber-optic light guide can be arranged in parallel with the lateral intermediate light disc. According to a further embodiment, the fiber-optic light guide can be made of a transparent or semi-transparent material. According to a further embodiment, the side of the fiber-optic light guide facing away from the lateral intermediate light disc can be provided with light reflecting means. According to a further embodiment, the light reflecting means at the side of the fiber-optic light guide facing away from the lateral intermediate light disc can be a light reflecting coating. According to a further embodiment, the vehicle illuminating device may have at least one second chamber adjacent to the first chamber comprising a second light source and a second reflector whose concavely curved backside at the same time forms a convexly protruding partial region of an inner wall of the first chamber, wherein the partial region of the reflector of the first chamber positioned opposite to the section is arranged as a partial reflector which deflects the light incident thereon from the light source in the direction towards the lateral section of the reflector of the first chamber. According to a further embodiment, the partial region of the reflector of the first chamber opposing the section may have therein integrated, integrally formed optical means for deflecting the incident light beams in the direction towards the lateral section in the reflector of the first chamber. According to a further embodiment, the integrally formed optical means integrated in the partial region of the reflector of the first chamber opposing the section for deflecting the incident light beams in the direction towards the lateral section in the reflector of the first chamber may be strip-shaped optical prism arranged in multiple rows one below the other whose reflecting surfaces each have a differently adjusted relative angle of inclination. According to a further embodiment, the first chamber together with the light source positioned therein and the lateral light region can be assigned to a rear light lamp in a vehicle illuminating device serving as a tail lamp. According to a further embodiment, the first chamber together with the light source positioned therein and the lateral light region can be assigned to a brake lamp in a vehicle illuminating device serving as a tail lamp. According to a further embodiment, the first chamber together with the light source positioned therein and the lateral light region can be assigned a to turn-signal indicator lamp in a vehicle illuminating device serving as a tail lamp or as a headlamp. According to a further embodiment, at least one chamber assigned to a first signal light function can be circumferentially enclosed by a light source of a further chamber assigned to a second signal light function.

BRIEF DESCRIPTION OF THE DRAWINGS

The invention is described in the following by way of exemplary embodiments on the basis of the corresponding drawings.

DETAILED DESCRIPTION

Figure 1:
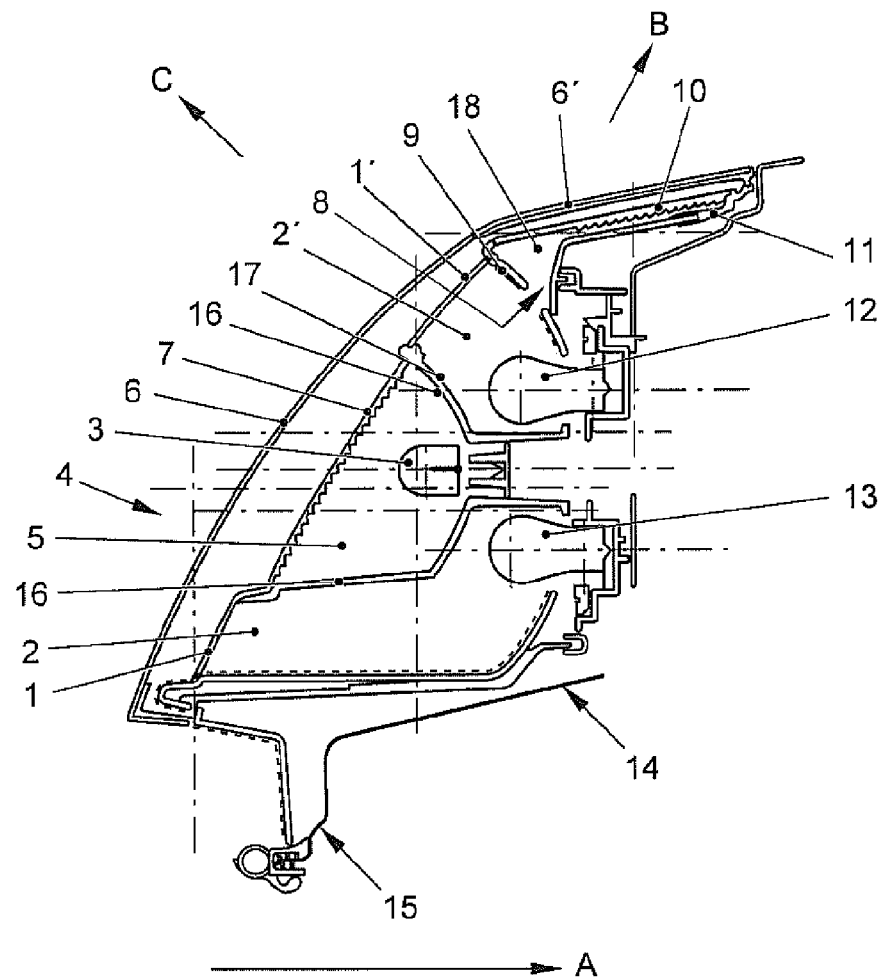
FIG. 1 shows a vehicle illuminating device according to various embodiments in a schematic cross-sectional view.

In a vehicle illuminating device for integrated mounting in each of a edge region of a motor vehicle its housing is provided with at least one chamber, at least one light source positioned in a bracket, at least one reflector, at least one intermediate light disc comprising therein optical means formed at least in partial regions, wherein the intermediate light disc comprises at least one signal function region dyed in a signal color, the electrical connection contacts and a cover housing disc arranged spaced from the intermediate light disc, by providing the at least one reflector according to various embodiments in a first chamber with at least one lateral section, which is provided in a essentially horizontal direction laterally facing away from the motor vehicle, the housing of the vehicle device comprises a lateral light region extended into the lateral region of the body of the vehicle, in which an additional lateral intermediate light disc is arranged, wherein the cover housing disc also covers the lateral light region comprising the lateral intermediate light disc from the outside in a distance, it is achieved that a portion of the light of the respective light source is outwardly emitted in essentially a lateral direction with respect to the driving direction of the vehicle through the lateral section in the corresponding reflector.

In an embodiment of the vehicle illuminating device, an additional lateral fiber-optic light guide is arranged in parallel to the lateral intermediate light disc in the lateral light region extended into the lateral region of the body of the vehicle, in which an additional lateral intermediate light disc is arranged, This fiber-optic light guide receives the incident light and guides it into the otherwise difficult to illuminate region of the relatively narrow and elongated formed secondary chamber of the lateral light region. The fiber-optic light guide is made of a transparent or semi-transparent material and in a further embodiment, the side of the fiber-optic light guide facing away from the lateral intermediate light disc is provided with a light reflecting means, so that the light guided through the fiber-optic light guide is guided outwardly towards the additional lateral intermediate light disc preferably without a loss. Besides further also feasible embodiments, the light reflecting means at the side of the fiber-optic light guide facing away from the lateral intermediate light disc may be a light reflecting layer, which for example is evaporated as a metallic layer.

In a further embodiment, the vehicle illuminating device comprises at least one second chamber adjacent to the first chamber comprising a second light source and a second reflector, the concave curved backside of which at the same time forms a convex protruding partial region of an inner wall of the first chamber, wherein a partial area of the reflector of the first chamber formed in the section opposing the reflector of the first chamber is arranged as a partial reflector which deflects the incident light in the direction towards the lateral section of the reflector of the first chamber. In this way it is feasible to also arrange a reflector in a vehicle illuminating device in a space saving manner on each of both sides of only one wall separating two chambers, if this wall on one side has a curved configuration of the face.

In a further embodiment, the partial region of the reflector of the first chamber opposing the section formed in the reflector of the first chamber has therewith integrated, integrally formed optical means for selective deflection of the incident light beams into the direction towards the lateral section in the reflector of the first chamber. Without these additional optical means the convex protruding partial region of the backside of the reflector of the second chamber would scatter the incident light and would not be able to concentrate the incident light, respectively. These additional integrally formed optical means for deflecting the incident light beams in the direction towards the lateral section in the reflector of the first chamber, integrated in the partial region of the reflector of the first chamber opposing the section, in a further embodiment are formed as strip-shaped optical prism arranged in multiple rows one below the other which by means of their sectioned inclined optical faces have the ability to divert the incident light into the desired direction.

In an example of use not limiting the invention the vehicle illuminating device, which comprises a first chamber comprising the therein positioned light source and the lateral light region according to the invention, is used as a rear light lamp in a vehicle illuminating device serving as a tail lamp.

In a further example of use not limiting the invention the vehicle illuminating device which comprises a first chamber comprising the light source positioned therein and comprises the lateral light region according to the invention is used as a brake lamp in a vehicle illuminating device serving as a tail lamp.

In yet another example of use not limiting the invention the vehicle illuminating device, which comprises a first chamber comprising the light source positioned therein and comprises the lateral light region according to the invention, is used as a turn-signal indicator lamp in a vehicle illuminating device serving as a tail lamp or as a headlamp.

In a further embodiment at least one chamber comprising a light source provided therein and assigned to a first signal light function is enclosed circumferentially by a further chamber assigned to a second signal light function. Thereby this results in advantages in the design of the emitting characteristics of both adjacent signal light functions.

The same characteristics according to various embodiments are applicable to different functional fields of application of a vehicle illuminating device as well in rear as also in front edge regions of a motor vehicle, for which an additional lateral visibility and marking function, respectively, has to be ensured.

FIG. 1 in a schematic cross-sectional view shows a preferred embodiment of the vehicle illuminating device 4, which together with its housing 14 in an edge region of a motor vehicle (not shown) is designed for integrated mounting into the form shape of the surface of the body of the vehicle.

The vehicle illuminating device 4 has an outer cover housing disc 6 which is extended elongated by means of a laterally elongated lateral light region 6'. Preferably, this cover housing disc 6, 6' is integrally designed and protects the interior of the vehicle illuminating device 4 against climatic conditions, in particular against the infiltration of rain, dust and humidity. Preferably, it is designed crystal clear and achromatically transparent, but, depending on the requirements of application, may also comprise integrally arranged optical means therein such as lenses, roughened regions and prism and as well as pigmentation. Further, as is generally known, it also serves creative purposes.

Arranged in a distance behind the cover housing disc 6, 6' is a integrally formed or multipart intermediate light disc 1, 1' and 7, wherein mainly in the laterally elongated lateral light region 6' according to various embodiments also an additional lateral intermediate light disc 10 is provided, which in this connection for the purpose of compactness is arranged relatively close to the cover housing disc 6', but still in a spaced manner and extending in parallel. The intermediate light disc (s) positioned in a spaced manner behind the cover housing disc(s) 6, 6' is (are) known in the art as mentioned above and serve as colored filter for dyeing the light of a light source 12 with the intended signal color and also for light scattering and concentration, as well as for the creative freedom and the desired occlusion of the light source details against visual access, respectively. In the present example the intermediate light disc 7 on its side facing towards the light source supports optical means for scattering the light, which for example comprise prism or also may be lenses in a further embodiment.

The intermediate light disc 1, 1', 7, 10 covers one each of the chambers 2, 2', 5 and the secondary chamber 18. In the present example the chambers 2 and 2' form a contiguous chamber, which is arranged around the exterior of the chamber 5 in a completely or partially enclosing manner, however, in another embodiment this chamber may also be divided into two separated chambers. Die chamber 2, 2' in this connection only as an example is provided with two light sources 12 and 13, which either double a function for safety reasons or carry out two similar signal light functions, such as for example rear light and brake light, which typically are provided with a signal colored in red in the European and North American field of application. The inner side of chamber 2, 2' is designed as a reflector 9 and for this preferably is provided with a light reflecting layer.

In an embodiment it is the requirement to emit the light of the light source 12, which commonly is designed as a light bulb held in a socket comprising electrical terminals, in addition to its main emitting direction through the intermediate light disc 1' also in a lateral direction with respect to the vehicle, preferably in a transverse direction with respect to its movement, which is shown using arrow A. For this, a section 8 laterally facing away from the vehicle in an outward direction is left open in the reflector 9 of the chamber 2'. The size of this section 8 is chosen thus that a sufficient amount of light is allowed to pass there through for the lateral marking indicator and at the same time the remaining regions of the reflector 9 can concentrate enough light of the light source 12 for emitting into the main emitting direction shown with arrow C.

Formed behind the section 8 in the reflector 9 of the chamber 2' is a secondary chamber 18 in which a fiber-optic light guide 11 and an additional lateral intermediate light disc 10 is arranged positioned in a spaced manner. The light of the light source 12 passes through the opening of the section 8, for the most part directly reaches the lateral intermediate light disc 10 and partially enters the fiber-optic light guide 11, in which the light is deflected and guided to the elongated, laterally diverting portion of the lateral intermediate light disc 10 and thereby also illuminates the portion of the lateral intermediate light disc 10 not illuminated directly. As a result there is yielded a main direction of the lateral additional lighting according to various embodiments, as indicated by the directional arrow B, which in an angle even slightly points to the front of the motor vehicle, this is to mean emits even better than only 90° laterally around the vehicle.

In the present exemplary embodiment the chambers 2 and 2' form a contiguous chamber 2, 2', whereby also a portion of the light of the second light source 13 deflected by the reflecting surfaces of chamber 2, 2' can be guided into the lateral secondary chamber 18 according to various embodiments. Thereby, in an example of use, the lateral light region 6' may be used for lateral marking by the rear light as well as for lateral marking by the brake light, if the light source 13 is for example responsible for the brake light signal and the light source 12 is responsible for the rear light signal, since the brake light for example has a much more intensive light intensity than the rear light and thereby a clearly visible distinction between the two is feasible.

Figure 2:
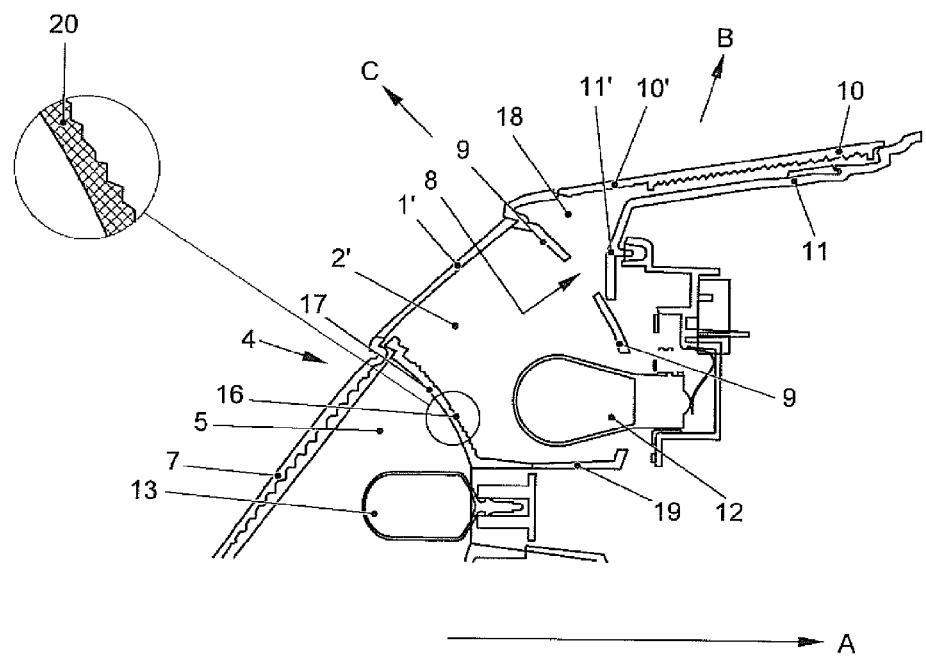
FIG. 2 shows a vehicle illuminating device according to FIG. 1 in a enhanced schematic partial cross-sectional view without cover housing disc.

FIG. 2, for a better demonstration of single details relevant to various embodiments, shows the embodiment of the vehicle illuminating device of FIG. 1 in an enhanced schematic partial cross-sectional view without cover housing disc 6, 6' and a portion of the housing 14. In favor of not yet described aspects a repeated description of the characteristics already shown in FIG. 1 is omitted in the following.

The side wall 17 of the second chamber 2' facing away from the outside of the vehicle is formed by the backside of the concave designed partial region of the reflector 16 of the adjacent chamber 5 and therefore is convex in an optically unfavorable manner when viewed from the first chamber 2', i.e. designed in a curved manner. However, the side wall 17 preferably also has to serve as a reflector face in the chamber 2' and has to be able to deflect the light beams of the light source 12 in a preferably favorable manner into the main emitting direction C as well as also into the lateral direction of beam B. Especially for this purpose the surface of the side wall 17 is preferably integrally provided with optical means, such as for example prism 20. Such prism may advantageously be designed as elongated grooves, whose faces with respect to the light source 12 are respectively arranged in an optimum angle of inclination for the desired direction of beam and the respective corresponding direction of beam B or C, wherein each prism groove 20 may have a different relative angle of inclination. In this embodiment, a partial region 17 of the side wall 17 located in close proximity to the light source 12 is provided with the prism grooves 20 such that their optical diverting abilities are essentially carried out in the lateral direction of beam B intended according to various embodiments. Thereby, in addition to the light portion emitted directly from the light source 12 through the opening of the section 8 laterally to the outside of the vehicle this additional light illumination deflected via the partial region 17 of the reflector of the first chamber 2' reaches the lateral intermediate light disc 10, which overall makes sure, that the necessary and often compulsory light intensity values are also reached in the direction lateral with respect to the driving direction.

The lower partial region of the reflector 19 as well as the partial regions 9 of the reflector circumferentially enclosing light source 12 make a contribution in concentrating the light of the light source 12 and in essentially emitting into the main emitting direction C. In a preferred embodiment all surfaces of the reflectors and the prism 20 are made light reflecting, for example by evaporation deposition of a metallic layer.

In the present example the intermediate light disc 1' serves as a colored filter and as a light scattering means. It may be designed crystal clear or may comprise optical means such as prism and lenses which serve to scatter the incident light and to occlude the interior of the chamber 2' against visual access. Depending on the example of use the light source 12 may be provided as a rear light and then for example may emit a red signal light via a intermediate light disc 1' dyed in red color.

The light leaving through the opening of the lateral section 8 of the reflector 9 impinges a lateral intermediate light disc 10 positioned in its path for this purpose, the disc 10 as well serving as a colored filter and a light scattering means. In this connection there exists a front part 10' of the lateral intermediate light disc 10, which is directly met by the light beams laterally deflected into the direction B, while the remaining partial region of the lateral intermediate light disc 10 further extended into the left and right side of the vehicle, respectively, cannot be directly captured by this light path. In order to also better illuminate the lateral region not directly positioned in the light path B a fiber-optic light guide 11 is formed and arranged such that a portion of the laterally deflected light beams enters a front part 11' of the fiber-optic light guide and, being diverted therein, reaches all the way to the most distant point of the fiber-optic light guide.

The fiber-optic light guide 11 by itself is a known element and according to the known manner designed of a transparent material, in most cases a plastic material. Its side facing away from the lateral intermediate light disc may be designed light reflecting in a preferred embodiment, such that the light is guided more effectively into the direction of the lateral intermediate light disc 10 and thereby to the outside. However, in one embodiment it may be left transparent and the inner wall of the housing (not shown) may be designed as a light reflecting surface instead.

Furthermore, in a preferred embodiment the portion of the lateral intermediate light disc 10 not directly illuminated by the light at the side facing to the inside is provided with optical means for scattering the light incident from the fiber-optic light guide 11, such as prism or lenses.

Figure 3:
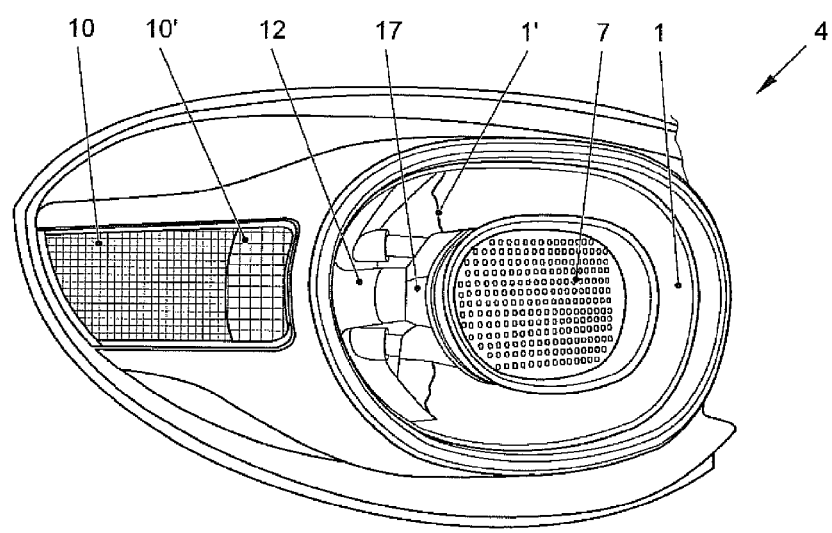
FIG. 3 shows a perspective exterior view of the vehicle illuminating device according FIG. 1 without cover housing disc.

FIG. 3 shows a perspective exterior view of the embodiment of the vehicle illuminating device 4 of FIG. 1, which is designed as a tail lamp without a cover housing disc 6, 6'.

It can clearly be seen that the intermediate light disc 1, 1' forms an intermediate light disc which encloses a central functional signal area which is covered by the intermediate light disc 7. The intermediate light disc 7 in this connection is designed achromatic for example and supports optical means such as lenses and/or prism for scattering the light incident thereto from chamber 5 from the light source 3. This for example white light may be used as a turn-signal indicator signal or a back-up light in an exemplary embodiment.

Provided behind the intermediate light disc 1' is the reflector 17 for deflecting a light portion of the light source 12 towards the lateral intermediate light disc 10, 10'. The region of the lateral intermediate light disc 10, 10' is located in the lateral region, in this case on the left side of a motor vehicle with regard to its driving direction.

The tail lamp 4 illustrated is covered by the cover housing disc 6, 6' (not shown) which protects the vehicle illuminating device 4 against climatic conditions.

The preceding embodiments are merely exemplary and not to be construed as to limit the present invention. The present inventive teachings may easily be carried forward to other types of light emitting apparatuses and applications. The description of the exemplary embodiments is provided to be demonstrative and not intended to limit the scope of the patent claims. Many alternatives, modifications and variants are evident to a person skilled in the art without departing from the scope of the present invention, which is set forth in the appended claims.

REFERENCE NUMERALS 1 intermediate light disc
1' intermediate light disc
2 chamber
2' first chamber
3 light source
4 vehicle illuminating device
5 second chamber
6 cover housing disc
6' cover housing disc, lateral light region
7 intermediate light disc
8 section
9 reflector
10 lateral intermediate light disc
10' lateral intermediate light disc, front part of the lateral intermediate light disc
11 fiber-optic light guide
11' fiber-optic light guide, front part of the fiber-optic light guide
12 light source
13 light source
14 housing
15 mounting protrusion
16 reflector
17 partial reflector, partial region of the reflector, side wall
18 secondary chamber
19 reflector, partial region of the reflector
20 optical means, prism

What is claimed is:

1. A vehicle illuminating device for integrated mounting in a corner region of a motor vehicle, having a housing comprising:
   at least one chamber,
   at least one light source positioned in a bracket,
   at least one reflector,
   at least one intermediate light disc comprising therein optical means at least formed in partial regions, wherein the intermediate light disc has at least one signal function region dyed in a signal color, the at least one signal function region disposed toward a first face of the corner region of the motor vehicle, and
   electrical connection contacts and a cover housing disc arranged in a manner spaced from the intermediate light disc,
   wherein the at least one reflector has at least one lateral section in a first chamber, which is provided in a essentially horizontal direction laterally facing away from the motor vehicle and disposed toward a second face of the corner region of the motor vehicle,
   the housing of the vehicle device has a lateral light region extended into the lateral region of the body of the vehicle, in which an additional lateral intermediate light disc is arranged,
   wherein the at least one light source emits light both through the at least one intermediate light disc facing the first face of the corner and through the additional lateral intermediate light disc in the essentially horizontal direction laterally facing away from the motor vehicle through the second face of the corner, and
   wherein the cover housing disc also covers the lateral light region comprising the lateral intermediate light disc from the outside with a distance.

2. The vehicle illuminating device according to claim 1, wherein in the lateral light region extended into the lateral region of the body of the vehicle in which a additional lateral intermediate light disc is arranged an additional lateral fiber-optic light guide is arranged in parallel with the lateral intermediate light disc.

3. The vehicle illuminating according to claim 2, wherein the fiber-optic light guide is made of a transparent or semi-transparent material.

4. The vehicle illuminating device according to claim 3, wherein the side of the fiber-optic light guide facing away from the lateral intermediate light disc is provided with light reflecting means.

5. The vehicle illuminating device according to claim 4, wherein the light reflecting means at the side of the fiber-optic light guide facing away from the lateral intermediate light disc is a light reflecting coating.

6. The vehicle illuminating device according to claim 1, wherein the vehicle illuminating device has at least one second chamber adjacent to the first chamber comprising a second light source and a second reflector whose concavely curved backside at the same time forms a convexly protruding partial region of an inner wall of the first chamber, wherein
   the partial region of the reflector of the first chamber positioned opposite to the section is arranged as a partial reflector which deflects the light incident thereon from the light source in the direction towards the lateral section of the reflector of the first chamber.

7. The vehicle illuminating device according to claim 6, wherein the partial region of the reflector of the first chamber opposing the section has therein integrated, integrally formed optical means for deflecting the incident light beams in the direction towards the lateral section in the reflector of the first chamber.

8. The vehicle illuminating device according to claim 7, wherein the integrally formed optical means integrated in the partial region of the reflector of the first chamber opposing the section for deflecting the incident light beams in the direction towards the lateral section in the reflector of the first chamber are strip-shaped optical prism arranged in multiple rows one below the other whose reflecting surfaces each have a differently adjusted relative angle of inclination.

9. The vehicle illuminating device according to claim 1, wherein the first chamber together with the light source positioned therein and the lateral light region are assigned to a rear light lamp in a vehicle illuminating device serving as a tail lamp.

10. The vehicle illuminating device according to claim 1, wherein the first chamber together with the light source positioned therein and the lateral light region are assigned to a brake lamp in a vehicle illuminating device serving as a tail lamp.

11. The vehicle illuminating device according to claim 1, wherein the first chamber together with the light source positioned therein and the lateral light region are assigned a to turn-signal indicator lamp in a vehicle illuminating device serving as a tail lamp or as a headlamp.

12. The vehicle illuminating device according to claim 1, wherein at least one chamber assigned to a first signal light function is circumferentially enclosed by a light source of a further chamber assigned to a second signal light function.

13. A vehicle illuminating device comprising:
a housing with a lateral light region extended into a lateral region of a vehicle body, wherein
an additional lateral intermediate light disc is arranged in the lateral light region,
a chamber in said housing,
a light source positioned in a bracket, the bracket disposed at least partially within the chamber,
a reflector with at least one lateral section in a first chamber, which is provided in a essentially horizontal direction laterally facing away from the motor vehicle,
an intermediate light disc comprising therein optical means at least formed in partial regions, wherein the intermediate light disc has at least one signal function region dyed in a signal color,
wherein the light source emits light both through the intermediate light disc disposed on a first face of the chamber and through the additional lateral intermediate light disc disposed on a second face of the chamber, the first face and the second face disposed at essentially a right angle to one another, and
electrical connection contacts and a cover housing disc arranged in a manner spaced from the intermediate light disc, wherein the cover housing disc also covers the lateral light region comprising the lateral intermediate light disc from the outside with a distance.

14. The vehicle illuminating device according to claim 13, wherein in the lateral light region extended into the lateral region of the body of the vehicle in which a additional lateral intermediate light disc is arranged an additional lateral fiber-optic light guide is arranged in parallel with the lateral intermediate light disc, and wherein
the fiber-optic light guide is made of a transparent or semi-transparent material.

15. The vehicle illuminating device according to claim 13, wherein the side of the fiber-optic light guide facing away from the lateral intermediate light disc is provided with light reflecting means and wherein
the light reflecting means at the side of the fiber-optic light guide facing away from the lateral intermediate light disc is a light reflecting coating.

16. The vehicle illuminating device according to claim 13, wherein the vehicle illuminating device has at least one second chamber adjacent to the first chamber comprising a second light source and a second reflector whose concavely curved backside at the same time forms a convexly protruding partial region of an inner wall of the first chamber, wherein
the partial region of the reflector of the first chamber positioned opposite to the section is arranged as a partial reflector which deflects the light incident thereon from the light source in the direction towards the lateral section of the reflector of the first chamber, wherein
the partial region of the reflector of the first chamber opposing the section has therein integrated, integrally formed optical means for deflecting the incident light beams in the direction towards the lateral section in the reflector of the first chamber, and wherein
the integrally formed optical means integrated in the partial region of the reflector of the first chamber opposing the section for deflecting the incident light beams in the direction towards the lateral section in the reflector of the first chamber are strip-shaped optical prism arranged in multiple rows one below the other whose reflecting surfaces each have a differently adjusted relative angle of inclination.

17. The vehicle illuminating device according to claim 13, wherein
the first chamber together with the light source positioned therein and the lateral light region are assigned to a rear light lamp in a vehicle illuminating device serving as a tail lamp.

18. The vehicle illuminating device according to claim 13, wherein the first chamber together with the light source positioned therein and the lateral light region are assigned to a brake lamp in a vehicle illuminating device serving as a tail lamp.

19. The vehicle illuminating device according to claim 13, wherein the first chamber together with the light source positioned therein and the lateral light region are assigned a to turn-signal indicator lamp in a vehicle illuminating device serving as a tail lamp or as a headlamp.

20. The vehicle illuminating device according to claim 13, wherein at least one chamber assigned to a first signal light function is circumferentially enclosed by a light source of a further chamber assigned to a second signal light function.

* * * * *